United States Patent [19]

Okada et al.

[11] Patent Number: 5,049,794
[45] Date of Patent: Sep. 17, 1991

[54] AUTOMOTIVE WIPER CONTROL SYSTEM WITH FAIL-SAFE FEATURE FOR PREVENTING BURN-IN OF WIPER MOTOR

[75] Inventors: Kazuyoshi Okada; Kiyoshi Konishi; Youzou Masaki, all of Kanagawa, Japan

[73] Assignees: Nissan Motor Company, Limited; Jidosha Denki Kogyo Kabushiki Kaisha, both of Yokohama, Japan

[21] Appl. No.: 35,355

[22] Filed: Apr. 7, 1987

[30] Foreign Application Priority Data

Apr. 7, 1986 [JP] Japan ............................... 61-79504

[51] Int. Cl.$^5$ ............................................. B60S 1/08
[52] U.S. Cl. ..................................... 318/443; 318/434; 318/DIG. 2
[58] Field of Search ............... 318/430, 431, 434, 443, 318/444, DIG. 2; 15/250 C, 250.17

[56] References Cited

U.S. PATENT DOCUMENTS

| | | | |
|---|---|---|---|
| 4,314,186 | 2/1982 | Gille et al. | 318/434 |
| 4,375,610 | 3/1983 | Nagaoka et al. | 318/DIG. 2 X |
| 4,451,768 | 5/1984 | Kohler et al. | 318/DIG. 2 X |
| 4,542,325 | 9/1985 | Kobayashi et al. | 318/443 X |
| 4,584,508 | 4/1986 | Kobayashi et al. | 318/483 |
| 4,603,316 | 7/1986 | Kobayashi et al. | 318/DIG. 2 X |

FOREIGN PATENT DOCUMENTS 44-17930 8/1969 Japan.
60-52013 11/1985 Japan.

OTHER PUBLICATIONS

"Windscreen Wiper Controller", Hobby Electronics, Mar. 1981, pp. 30–31.
Greg Swain, "A Control Unit for Windscreen Wipers", Electronics, Australia, Sep. 1979, pp. 68–73.

Primary Examiner—Bentsu Ro
Attorney, Agent, or Firm—Foley & Lardner

[57] ABSTRACT

A wiper control system includes measures an elapsed time of operation cycle, through which a wiper blade assembly performs one cycle of wiper operation. The wiper control system resets the measured elapsed time when ever the wiper blade assembly reaches a predetermined position. On the other hand, wiper control system detects the measured elapsed time exceeding a given period of time to initiate a predetermined fail-safe operation. In practice, the fail-safe operation is performed to intermittently drive the wiper motor with an interval which is long enough to sufficiently cooling off the wiper motor, when fail-safe operation is performed while wiper system is maintained ON, and to terminate driving of the wiper motor when the wiper system is turned OFF.

4 Claims, 7 Drawing Sheets

AUTOMOTIVE WIPER CONTROL SYSTEM WITH FAIL-SAFE FEATURE FOR PREVENTING BURN-IN OF WIPER MOTOR

BACKGROUND OF THE INVENTION

1. Field of the Invention

The present invention relates generally to a wiper control system for an automotive vehicle, which wiper control system is facilitated with an INTERMITTENT mode operation. More specifically, the invention relates to an automotive wiper control system with a fail-safe feature to avoid burnout of a wiper motor even when a wiper blade assembly is stuck or locked on the vehicular windshield. Further particularly, the invention relates to an automotive wiper control system with an auto-stop function for automatically stopping the wiper blade assembly at a predetermined position and a fail-safe function cooperating with the auto-stop function.

2. Description of the Prior Art

It is usually experienced that a wiper blade assembly of an automotive wiper system locks due to substantial resistance against the wiper blade. For example, it is frequently experienced that the wiper blade is locked at an intermediate position between its motion ends during driving of the vehicle in the snow. When such high resistance is exerted to lock the wiper blade, driving power tends to be applied to the wiper motor to cause it to burn out. In order to prevent the wiper motor from burning out, there has been proposed, in the conventional wiper system, to provide a circuit breaker which is responsive to an internal temperature of the wiper motor to break power supply for the wiper motor when the internal temperature of the wiper motor becomes excessive. In the usual case, such a circuit breaker is successful to prevent the wiper motor from burning out by breaking power supply everytime the internal temperature of the wiper motor becomes excessive. Such type of wiper systems have been disclosed in the Japanese Patent Second Publication (Tokko) Showa 60-52013 and the Japanese Utility Model Second Publication (Jikko) Showa 44-17930.

However, such wiper systems with circuit breakers will not be successful in prevention of burn-out of the wiper motors in substantially cold environmental conditions. For instance, when the atmospheric temperature is approximately $-40°$ C., the internal temperature of the wiper motor will not rise to the given temperature at which the circuit breaker becomes active. Therefore, the power supply can be continued until burnout of the wiper motor occurs.

SUMMARY OF THE INVENTION

Therefore, it is an object of the present invention to provide a wiper control system which can assure prevention of burnout of a wiper motor at any environmental condition, Another object of the invention is to provide of a wiper control system which detects locking condition of a wiper blade assembly without being influenced by the environmental conditions.

A further object of the invention is to provide a wiper control system which takes different fail-safe operations depending upon the operational modes of the wiper system.

In order to accomplish the aforementioned and other objects, a wiper control system, according to the present invention, measures an elapsed time of operation cycle, through which a wiper blade assembly performs one cycle of wiper operation. The wiper control system resets the measured elapsed time whenever the wiper blade assembly reaches a predetermined position. On the other hand, wiper control system is detects the measured elapsed time exceeding a given period of time to initiate a predetermined fail-safe operation.

In practice, the fail-safe operation is performed to intermittently drive the wiper motor with an interval which is long enough to sufficiently cool off the wiper motor, when fail-safe operation is performed while wiper system is maintained ON, and to terminate driving of the wiper motor when the wiper system is turned OFF. o According to one aspect of the invention, an automotive wiper control system comprises a wiper motor for driving a wiper blade assembly through each wiper cycle, a power source for supplying power for the wiper motor, means for detecting a wiper blade assembly at a predetermined position for producing a detector signal when the wiper blade assembly at the predetermined position is detected, means for measuring an elapsed time during wiper operation, the measuring means being responsive to the detector signal for resetting the measured time in response to the detector signal and producing a failure indicative signal when the measured time reaches a given period of time, and means for controlling power supply for the wiper motor from the power source for controlling wiper speed, operation timing depending upon operation modes of a wiper system, the controlling means being responsive to the failure indicative signal for initiating a predetermined fail-safe operation.

The automotive wiper control system further comprises means, manually operable, for selecting one of a plurality of wiper operation modes which includes an OFF mode. The detecting means comprises wiper position detector switch means which is maintained at a first position while the wiper blade assembly is in operation through each wiper cycle, and shifted at a second position when the wiper blade assembly reaches the predetermined position, and the detecting means detecting the wiper position detector switch means positioned at the second position to output the detector signal. On the other hand, the controlling means intermittently drive the wiper motor with a given interval during fail-safe operation irrespectively of the operation mode. The controlling means is also responsive to the mode selecting means as operated to the OFF mode position to stop power supply for stopping wiper system operation.

The automotive wiper control system further comprises a power supply control switch means interposed between the power source and the wiper motor and operative between a first position in which the wiper motor is connected to the power source and a second position where the wiper motor is disconnected to from the power source, and an intermittent control switch means interposed between the wiper motor and the ground and opertive between a first position to connect the wiper motor to the ground and a second position where the wiper motor is disconnected from the ground, and the controlling means is responsive to the failure indicative signal to switch one of the power supply control switch and the the intermittent control switch to the second position to stop driving of the wiper motor. The controlling means operates the power supply control switch means to the second position while the wiper position detector switch means of the detecting means is in the first position, and operates the intermittent control switch means to the second position when the wiper position detector switch means of the detecting means is in the second position.

In the preferred construction, the wiper system is facilitated to perform rise-up function for moving the wiper blade assembly between the predetermined position and a rest position which is downwardly shifted from the predetermined position, and the detecting means is adapted to detect the wiper blade assembly reaching at the rest position to produce a rest position indicative signal. The wiper position detector switch means is maintained at the second position while the wiper blade travels from the predetermined position to the rest position and switched into the first position when the wiper blade assembly reaches the first position. The measuring means measures an elapsed time during the period in which the wiper blade assembly travels from the predetermined position to the rest position to output the failure indicative signal when the measured time reaches the predetermined period of time.

The controlling means is responsive to the failure indicative signal produced during the wiper blade assembly position between the predetermined position and the rest position to make the wiper system inoperative.

According to another aspect of the invention, a control system for controlling an automotive wiper system which is opertive at least in LOW speed mode in which a wiper motor is driven continuously at a predetermined low speed, HIGH speed mode, in which the wiper motor is driven continuously at a predetermined high speed, and an INTERMITTENT mode, in which the wiper motor is intermittently driven to stop at a predetermined position for a predetermined intermittent interval after each cycle of wiper operation, the control system comprises a power source for supplying power for the wiper motor, means for detecting a wiper operation cycle taking an abnormally long period of time which is longer than a given reference period to produce a failure indicative signal, means for controlling the wiper motor for driving the latter at a controlled speed and timing according to a selected operation mode, the controlling means being responsive to the failure indicative signal to control operation of the wiper motor according to a schedule preset for fail-safe mode operation.

DESCRIPTION OF THE PREFERRED EMBODIMENT

Figure 1:
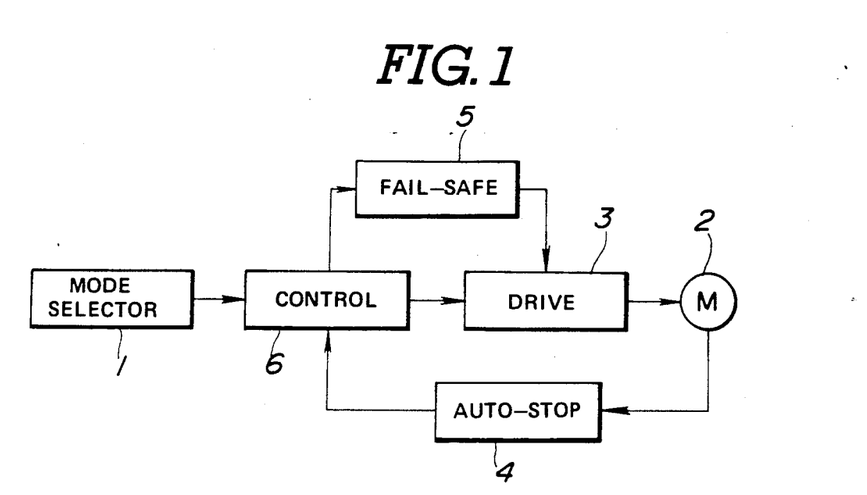
FIG. 1 is a schematic block diagram showing general construction of a wiper control system according to the present invention.

Referring now to the drawings, particularly to FIG. 1, a wiper control system, according to the present invention, includes a wiper motor 2 for driving a wiper blade assembly (not shown) which comprises a wiper blade and a wiper arm. The wiper motor 2 is generally driven in one direction to drive the wiper blade assembly in each wiper operation cycle which includes wiper blade movement in one direction and in the other opposite direction. Therefore, as is well known, the wiper blade motion starts from a predetermined initial position to return the same initial position at the end of each cycle of wiper operation. The wiper motor 2 is operable in various operation modes, e.g. LOW mode in which the wiper motor drives the wiper blade assembly at a predetermined low speed, HIGH mode in which the wiper motor drives the wiper blade assembly at a predetermined high speed, INTERMITTENT mode in which the wiper motor intermittently drives the wiper blade assembly with a given intervals between cycles of wiper operation, WASHER mode in which the wiper motor drives in synchronizm with driving a washer pump through given number of wiper cycles and OFF mode. Such various operation modes of the wiper motor 2 is selected through a mode selector switch 1.

The mode selector switch 1 is connected to a wiper control circuit including a control stage 6, a wiper drive signal generating stage 3, and a fail-safe stage 5. The wiper control circuit is further associated with a switch 4 for automatically stopping the wiper blade assembly at a predetermined position, such as an initial position. Namely, the switch 4 serves for terminating driving of the wiper motor when the wiper blade assembly reaches the predetermined initial position, to stop the wiper blade assembly at the predetermined position. On the other hand, the switch 4 maintains the wiper motor in operation through each cycle of wiper operation, For instance, even when the mode selector switch 1 is operated to the OFF mode position at the position of the wiper blade assembly other than the predetermined position, the switch 4 maintains the power supply to the wiper motor ON to complete the instant cycle of the wiper operation. After completing the instant cycle of the wiper operation, the wiper blade assembly finally reach the predetermined position. Then the switch 4 terminates power supply to the wiper motor to stop the wiper blade assembly. This switch 4 will be hereafter referred to as an "auto-stop switch". The auto-stop switch is further operative, in the INTERMITTENT mode operation, to exert a braking force, i.e. armature brake, for stopping the wiper blade assembly at the predetermined initial position.

The auto-stop switch 4 employed in the present invention, is designed to produce an auto-stop signal everytime the wiper blade assembly reaches the predetermined initial position. The auto-stop signal of the auto-stop switch 4 is input to the control stage 6. The control stage 6 is designed to output a wiper control signal to the drive signal generating stage 3 for driving the wiper motor at the given speed determined corresponding to the operation mode selected through the mode selector switch 1. Also, the control stage 6 is designed to measure an elapsed time through each cycle of wiper operation, in which power supply for the wiper motor is continued. The control stage 6 is responsive to the auto-stop signal to clear the measured elapsed time. On the other hand, the control stage 6 outputs a fail indicative signal when the measured elapsed time become longer than a given period of time.

Namely, the control stage 6 monitors the length of each cycle of the wiper operation to detect abnormally longer period of time of the wiper operation cycle. Therefore, the given period of time set in the control stage 6 is a possible maximum length of the wiper operation cycle. As long as the wiper blade is not locked or stuck on the windshield at an intermediate position in the wiper operation cycle, the length of the wiper operation cycle is shorter than the given period of time. On the other hand, when substantially high resistance is exerted on the wiper blade, such as that exerted by the snow, the wiper operation cycle tends to become longer than the given period of time. The high resistance against the wiper blade motion serves as high load on the wiper motor to possibly cause burn-out.

Therefore, the fail indicative signal is fed to the fail-safe stage 5 to initiate fail-safe operation. The fail-safe stage 5 is responsive to the fail indicative signal to perform fail-safe operation for preventing the wiper motor from burning-out. In the preferred operation, the fail-safe stage 5 performs different fail-safe operation depending upon the operation mode selected through the mode selector switch 1. For instance, when the selected operation mode is OFF mode, the fail-safe stage 5 shut-off the power supply to the wiper motor 2 irrespective of the auto-stop switch position. On the other hand, when the selected mode is other than OFF mode, the fail-safe stage 6 intermittently supply the power to the wiper motor 2 with a given interval which is long enough to sufficiently cool the wiper motor, or otherwise, to temporarily shut-off the power supply for a predetermined shut-off period of time.

Figure 2:
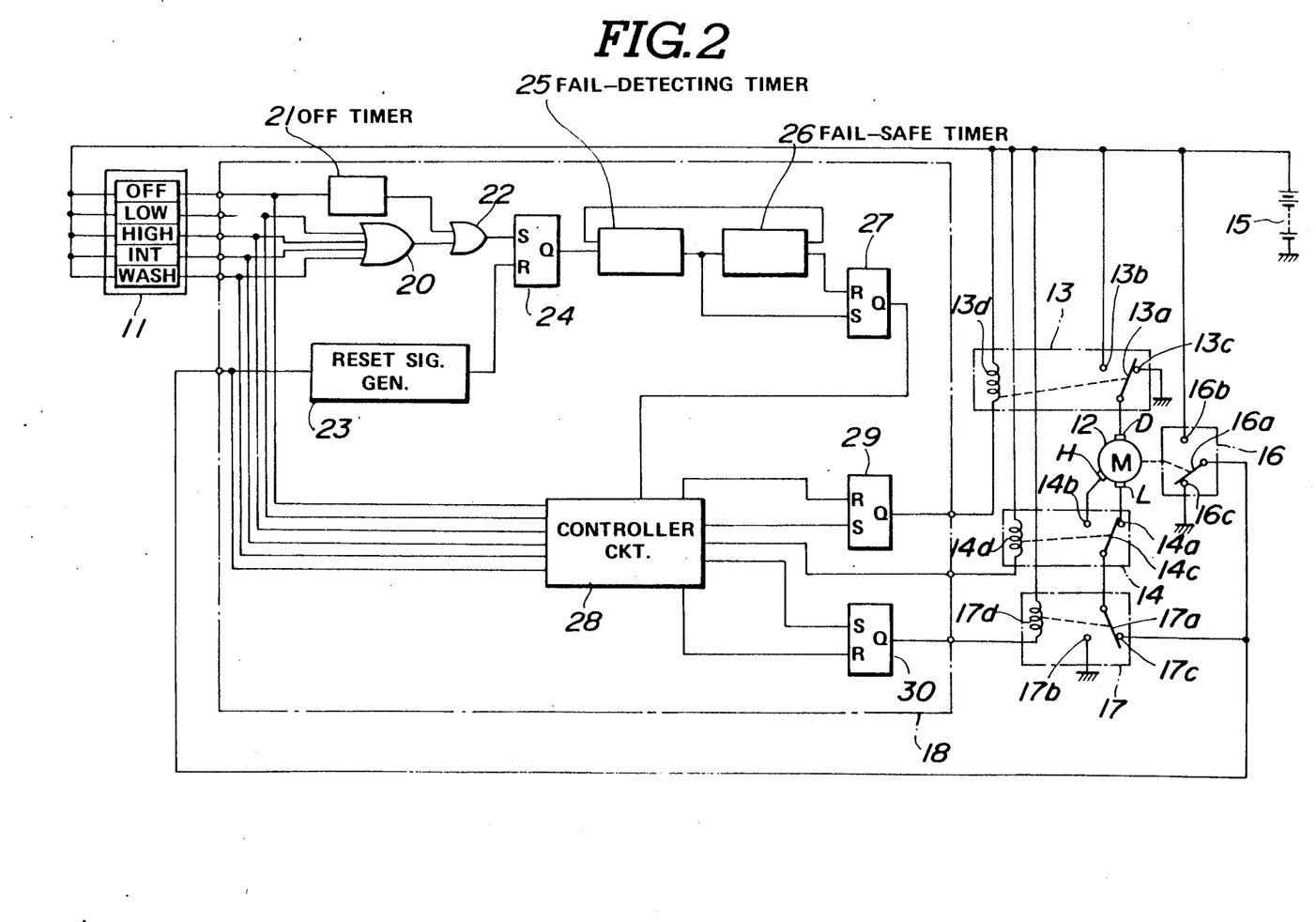
FIG. 2 is a block diagram of the preferred embodiment of a wiper control system according to the invention.

FIG. 2 shows the preferred embodiment of the wiper control system according to the invention. The shown embodiment of the wiper control system is applied for a wiper system which is facilitated with a rise-up function. As is well known, the wiper system with the rise-up function holds the wiper blade assembly at inoperative position or rest downwardly shifted from the initial position while the wiper system is held at OFF position. On the other hand, while the wiper system is in operation, the wiper operation cycles start from the initial position. Therefore, at the end of each cycle of wiper operation, the wiper motion ends at the initial position.

As shown in FIG. 2, a mode selector switch 11 is manually operable to select one of OFF mode, LOW mode, HIGH mode, INTERMITTENT mode and WASHER mode. As is well known, there are various wiper systems available in the market. Especially, there are various wiper systems respectively perform unique wiper control in the INTERMITTENT mode. For example, one of the typical wiper control systems has a fixed intermittent interval between each cycle of wiper operation. The other one of typical wiper control systems has a variable intermittent interval between a minimum and maximum period of time. Furthermore, some of wiper control systems introduces a rain condition dependent wiper control for adjusting the intermittent interval depending upon rain contion. Such rain condition dependent automatic wiper control system has been disclosed in the U.S. Pat. Nos. 4,542,325, 4,584,508, 4,603,316, respectively issued on Sept. 17, 1985, Apr. 22, 1986 and July 29, 1986, and all being assigned to the common assignees to the present invention. The disclosure of the above-identified United State Patents are herein incorporated by reference for the sake of disclosure.

It should be appreciated that though the specific constructions of the wiper control system will be described herebelow in terms of the preferred embodiment of the invention, the present invention should be applicable for any types of the wiper systems.

A wiper motor 12 has a power supply brush D, a low speed brush L and a high speed brush H. The power supply brush D is connected to a power source 15, i.e. a vehicular battery via a power supply relay switch 13. The power supply relay switch 13 has a movable contact 13a, a stationary terminal 13b which is connected to the power source battery 15 and a stationary terminal 13c which is connected to the ground. The movable contact 13a of the power supply relay switch 13 is connected to the power supply brush D of the wiper motor 12 and associated with a relay coil 13d.

The low speed brush L and the high speed brush H of the wiper motor 12 is connected to stationary terminals 14a and 14b of a speed control relay switch 14. The speed control relay switch 14 also has a movable contact 14c and a relay coil 14d. The movable contact 14c is so associated with the relay coil 14d as to be held at a low speed position to contact with the stationary terminal 14a which is, in turn, connected to the low speed brush L of the wiper motor, while the relay coil 14d is held deenergized condition, and to be shifted to a high speed position while the relay coil 14d is energized, to be connected to the stationary terminal 14b which is, in turn connected to the high speed brush H. The movable contact 14c of the speed control relay switch 14 is, in turn, connected to a movable contact 17a of an intermittent control relay switch 17. The intermittent control relay switch 17 incorporates a relay coil 17d associated with the movable contact 17a to shift the movable contact between stationary terminals 17b and 17c. The stationary terminal 17b is connected to the ground and the stationary terminal 17c is connected to the input side of a wiper control circuit 18 to feed a signal serving as a feedback auto-stop signal.

An auto-stop switch 16 is also provided in the preferred embodiment of the wiper control system. The auto-stop switch 16 comprises a movable contact 16a and stationary terminals 16b and 16c. The stationary terminal 16b is connected to the power source battery 15. On the other hand, the stationary terminal 16c is connected to the ground. The movable contacy 16a of the auto-stop switch 16 is mechanically connected to the wiper motor 12 to be driven with the wiper blade assembly. Though the auto-stop switch 16 is illustrated as a normal ON/OFF switch, it may be practically formed with a rotary switch to maintain conductive state at any intermediate position of the wiper blade assembly in the wiper operation cycle and to be turned into non-conductive state at the predetermined initial position of the wiper blade assembly.

Figure 3:
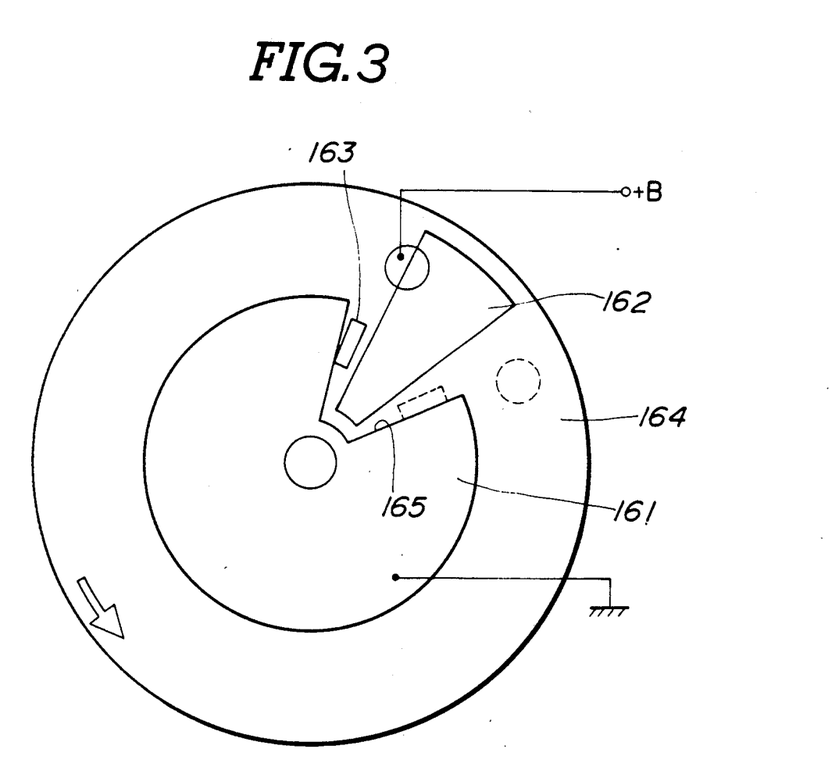
FIG. 3 is a fragmentary illustration of an auto-stop switch employed in the preferred embodiment of the wiper control system of FIG. 2.

FIG. 3 shows one of typical construction of the auto-stop switch 16. In the shown construction, the auto-stop switch 16 comprises a first segment 161 which is connected to the ground and thus serves as the stationary terminal 16c, a second segment 162 which is connected to the power source battery 15 and thus serves as the stationary terminal 16b, and a rotary segment 164 carrying a contact 163 which serves as the movable contact 16a. In the wiper control circuit of FIG. 2, the contact 163 is connected to the stationary terminal 17c of the intermittent control relay switch 17. As will be seen from FIG. 3, the first segment 161 is formed with cut-out 165. The second segment 162 is disposed within the cut-out. The cut-out 165 and the second segment 162 are oriented at a position corresponding to the predetermined initial position of the wiper blade assembly.

With the shown construction, while the wiper blade assembly is in the intermediate position in the wiper operation cycle, the contact 163 is held in contact with the first segment 161 and thus connected to the ground. At a position a, the contact 163 releases from the first segment 161 and immediately thereafter with a substantially short floating condition, in which the contact 164 contacts neither of the first and second segments 161 and 162, the contact 163 comes into contact with the second segment 162 and thus connected to the power source battery 15.

With the construction set forth above, the potential at the contact 163 is held LOW level while the wiper blade assemble is in any intermediate position in the wiper operation cycle and turns into HIGH level when the wiper blade assembly reaches the predetermined initial position.

The wiper control circuit 18 comprises a logic circuit and is connected to the mode selector switch 11. The wiper control circuit 18 includes an OR gate 20 connected to LOW mode, HIGH mode, INTERMITTENT mode and WASHER mode output terminals of the mode selector switch 11. When the mode selector switch 11 is operated one of the LOW mode, HIGH mode, INTERMITTENT mode and WASHER mode positions, the OR gate 20 is responsive to HIGH level ("1") of output at the associated output terminal of the mode selector switch to turn the OR gate signal level from LOW level ("0") to the HIGH level.

The OR gate 20 is connected to one input terminal of an OR gate 22. The other input terminal of the OR gate 22 is connected to an Off timer circuit 21 which is, in turn, connected to an OFF mode output terminal of the mode selector switch 11. The Off timer circuit 21 is responsive to an OFF mode selector signal output from the OFF mode output terminal to output HIGH level signal for a given period of time. Therefore, the OR gate 22 receives HIGH level signal from the OR gate 20 while the mode selector switch 11 is held at any one of the LOW mode, HIGH mode, INTERMITTENT mode and WASHER mode positions and from the OFF timer circuit 21 for a given period of time of setting of the mode selector switch 11 at the OFF mode position.

The output terminal of the OR gate 22 is connected to a set input terminal of a flip-flop circuit 24. The flip-flop circuit 24 has a reset input terminal connected to a reset signal generator circuit 23 which is, in turn, connected to the movable contact 16a of the auto-stop switch 16 and the stationary terminal 17c of the intermittent control switch 17. The reset signal generator circuit 23 is responsive to leading and trailing edge of its HIGH level input to output a reset signal to the flip-flop circuit 24 to reset the latter. The output terminal of the flip-flop circuit 24 is connected to a fail-detecting timer circuit 25. The fail-detecting timer circuit 25 is designed for measuring the elapsed time $T_1$ of each wiper operation cycle to output a TIME-UP indicative signal when the measured time reaches a given period of time $T_1$. The fail-detecting timer circuit 25 is set by the SET ("1") signal from the flip-flop circuit 24 to initiate measurement of the elapsed time and is reset by the RESET ("0") signal from the flip-flop circuit. The fail-detecting timer circuit 25 is also associated with a fail-safe timer 26 which is designed to measure a given perind $T_2$. The fail-safe timer 26 is connected to the fail-detecting timer 25 to receive therefrom the TIME-UP indicative signal to initiate measurement of the given perimd of time $T_2$. The fail-safe timer 26 outputs an enabling signal after the given period of time $T_2$. The enabling signal is fed back to the fail-detecting timer 25 to reset the timer value of the latter. At the same time, the fail-safe timer 26 feeds the enabling signal to the reset input terminal of a flip-flop circuit 27. The set input terminal of the flip-flop circuit 27 is connected to the fail-detecting timer 25 to receive the TIME-UP indicative signal. Therefore, the flip-flop circuit 27 is set by the TIME-UP indicative signal from the fail-detecting timer 25 and reset by the enabling signal of the fail-safe timer 26.

The wiper control circuit 18 further includes a controller circuit 28 which is connected to LOW mode, HIGH mode, INTERMITTEN mode, WASHER mode and OFF mode output terminals of the mode selector switch 11. The controller circuit 28 is also connected to the output terminal of the flip-flop circuit 27. The controller circuit 28 has a pair of output terminals respectively connected to set and reset input terminals of a power supply control flip-flop circuit 29 which has an output terminal connected to the power source battery 15 via the relay coil 13d of the power supply control relay circuit 13. The controller circuit 28 also have another pair of output terminals respectively connected to set and rest input terminals of an intermeittent control flip-flop circuit 30 which is, in turn, connected to the power source battery 15 via the relay coil 17d of the intermittent control relay circuit 17. The controller circuit 28 further has an output terminal connected to the power source battery 15 via the relay coil 14d of the wiper speed control relay circuit 14. The input level at the set input terminal of the power supply control flip-flop circuit 29 from the controller circuit 28 becomes LOW ("0") and the input level at the reset input terminal of the power supply control flip-flop circuit becomes HIGH ("1") when one of the LOW speed mode, HIGH speed mode, INTERMITTENT mode and WASHER mode is selected through the mode selector switch 11 while the wiper system is in normal condition. Therefore, the flip-flop circuit 29 is reset to maintain the output level at the output terminal thereof at LOW level. At this condition, the electric current from the power source battery 15 flows through the relay coil 13d to the flip-flop circuit 29 to energize the relay coil 13d. As a result, the movable contact 13a is shifted to contact with the stationary terminal 13b to establish electric connection between the power source battery 15 and the power supply terminal D of the wiper motor 12. On the other hand, when the OFF mode is selected through the mode selector switch 11, the input level at the set input terminal of the power supply control flip-flop circuit 29 from the controller circuit 28 becomes HIGH and the input level at the reset input terminal of the power supply control flip-flop circuit becomes LOW during fail-safe mode operation. Therefore, the flip-flop circuit 29 is set to maintain the output level at the output terminal thereof at HIGH level. At this condition, the electric current from the power source battery 15 through the relay coil 13d is blocked to deenergize the relay coil 13d. As a result, the movable contact 13a is shifted to contact with the stationary terminal 13c to ground the power supply.

On the other hand, when the INTERMITTENT mode is selected in the normal condition of the wiper system, the input level at the reset input terminal of the intermittent control flip-flop circuit 30 becomes LOW and the input level at the set input terminal of the flip-flop circuit 30 becomes HIGH. Therefore, the intermittent control flip-flop circuit 30 is set to deenergize the relay coil 17d of the intermittent control relay switch 17. Therefore, the movable contact 17a of the relay switch 17 is turned into contact with the terminal 17c, which position will be referred to as "intermittent mode position". As will be appreciated, at this position, the movable contact 17a of the intermittent control relay switch 17 is connected to the movable contact 16a of the auto-stop switch 16 via the stationary terminal 17c. While the wiper blade assembly is in intermediate position in the wiper operation cycle, the movable contact 16a of the auto-stop switch is connected to the stationary terminal 16c to connect the movable contact 17a to the ground therethrough, as set forth above. On the other hand, at the predetermined initial position of the wiper blade assembly, the movable contact 16a is switched the position to contact with the stationary contact 16b. At this position, the movable contact 17a is connected to the power source battery 15 via the auto-stop switch 16. This causes so-called amerture brake to stop motion of the wiper blade assembly at the predetermined initial position. In the INTERMITTENT mode, the input levels for the intermittent control flip-flop 30 are temporarily switched to input HIGH level to the reset input terminal and LOW level to the set input terminal for a short period, after a given intermittent interval while the wiper motor is held inoperative and the wiper blade assembly is placed at the predetermined initial position. By switching the input level as set forth above, the intermittent control flip-flop circuit 30 is temporarily reset to energize the relay coil 17d of the intermittent control relay switch 17. As a result, the movable contact 17a is shifted to contact with the stationary terminal 17b to connect the movable contact 17a to the ground. As a result, the electric current flows through the wiper motor to restart driving of the wiper motor 12. By this, the wiper blade assembly motion for one cycle of the wiper operation is initiated to shift the movable contact 16a of the auto-stop switch 16 to contact with the stationary contact 16c. After this, the input level at the reset input terminal of the intermittent control flip-flop circuit 30 becomes LOW and the input level at the set input terminal of the flip-flop circuit 30 becomes HIGH, again. Therefore, the intermittent control flip-flop circuit 30 is set to deenergize the relay coil 17d of the intermittent control relay switch 17. Therefore, the movable contact 17a of the relay switch 17 is turned into contact with the terminal 17c.

Contrary to this, when the operation mode other than the INTERMITTENT mode is selected through the mode selector switch 11 in normal mode operation, the input level at the reset input terminal of the intermittent control flip-flop circuit 30 becomes HIGH and the input level at the set input terminal of the flip-flop circuit 30 becomes LOW. Therefore, the intermittent control flip-flop circuit 30 is reset to energize the relay coil 17d of the intermittent control relay switch 17. The movable contact 17a of the relay switch 17 is thus turned into contact with the terminal 17b, which position will be referred to as "continuous mode position".

It should be appreciated that the flip-flop circuits 24, 27, 29 and 30 employed in the shown embodiment of the wiper control circuit are operates to perform reset functions rather than set functions when HIGH levels are applied at both of set and reset input terminals.

Figure 4:
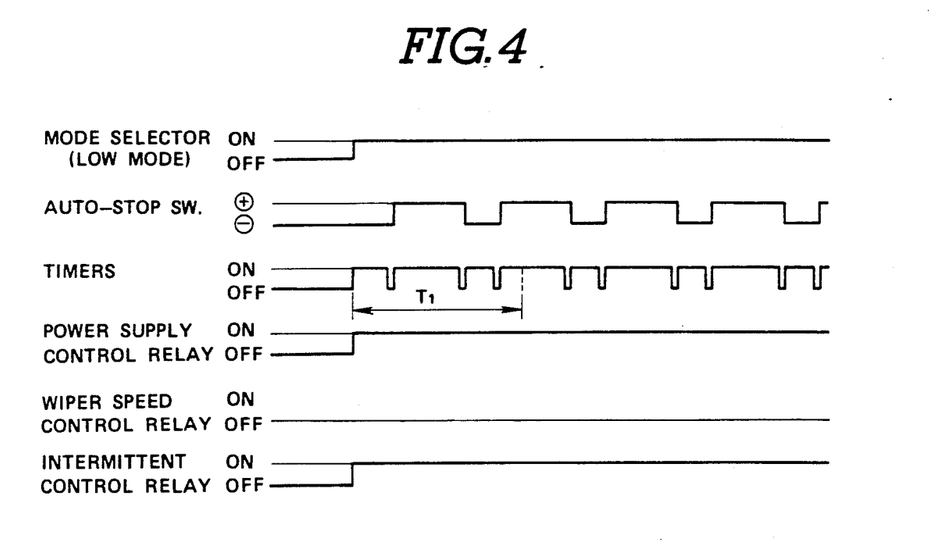
FIG. 4 is a timing chart showing the operation of the wiper control system as operated in LOW mode and showing normal operation in LOW mode.

Operation of the afore-mentioned preferred embodiment of the wiper control system according to the invention will be discussed with reference to FIGS. 3 to 5.

At first, the nomal mode operation will be illustrated with reference to FIG. 3. Assuming the mode selector switch 11 is set at the LOW mode position, the output level at the LOW mode output terminal of the mode selector switch 11 turns into HIGH level. Then, the controller circuit 28 receives the HIGH level input from the LOW mode output terminal of the mode selector switch 11. In response to this, the HIGH level is input at the reset input terminal of the power supply control flip-flop circuit 29 to energize the relay coil 13d of the power supply control relay switch 13. Thus, the power supply brush D of the wiper motor 12 is connected to the power source battery 15 via the stationary terminal 13b and the movable contact 13a. On the other hand, the HIGH level output appears the output terminal connected to the relay coil 14d of the wiper speed control relay switch 14 to deenergize the relay coil. Therefore, the movable contact 14c contact with the stationary terminal 14a to connect the LOW speed brush L of the wiper motor 12 to the movable contact 17a of the intermittent control relay switch 17. At this time, the input level at the reset input terminal of the intermittent control flip-flop circuit 30 is also turned into HIGH level to reset the flip-flop. As a result, the relay coil 17d of the intermittent control relay switch 17 is energized to shift the movable contact 17a to contat with the stationary terminal 17b. Therefore, the power source battery 15 is connected to the ground through the stationary terminal 13b, the movable contact 13a, the power supply brush D, the LOW speed brush L, the stationary terminal 14a, the movable contact 14c, the movable contact 17a and the stationary contact 17b.

Therefore, the wiper motor 12 is driven at the predetermined LOW speed.

As set forth, since the movable contact of the auto-stop switch 16 is driven with the wiper motor revolution, the auto-stop signal level is maintained LOW level while the movable contact 16a is held in contact with the stationary terminal 16c during the wiper operation cycle. The auto-stop signal level turns into HIGH level when the movable contact 16a comes into contact with the stationary terminal 16b at each end of the wiper cycle. Therefore, as long as the wiper system operates in LOW speed mode in normal condition, the auto-stop signal level varies as shows in FIG. 3.

At the time of setting at LOW mode of the mode selector switch 11, the input level at one input terminal of the OR gate 20 becomes HIGH level. Therefore, the output level of the OR gate becomes HIGH. The OR gate 22 is responsive to the HIGH level input from the OR gate 20 to output the HIGH level output signal. At the leading edge of the HIGH level output of the OR gate 22, the fail-detecting timer 25 is triggered to start measurement of the elapsed time. Since the auto-stop signal level changes between HIGH and LOW level around the predetermined initial position at substantially constant timing, the reset signals are output everytime the auto-stop signal level changes. The fail-detecting timer 25 continuously measure the elapsed time until the output level of the flip-flop circuit 24 turns into LOW level in response to the reset signal. As long as the wiper system is in operation in the normal mode, the auto-stop signal from the auto-stop switch 16 turns HIGH and LOW level in a period shorter than the given period of time $T_1$, as shown in FIG. 3. Therefore, the timer value of the fail-detecting timer 25 is reset before the timer value reaches the given period indicative value $T_1$.

Therefore, as seen from FIG. 3, during the normal condition of the wiper system, the fail-detecting timer 25 is repeatedly reset with shorter intervals than the given period of time $T_1$. Since the output of the fail-detecting timer 25 is thus held LOW level, the fail-safe timer 26 is held inoperative and the flip-flop circuit 27 is maintained at reset position.

During the wiper operation in any operation mode, it tends to happen that the wiper blade is locked at a certain position due to substantially high resistance. For example, in the heavy snow, the snow accumulated on windshield tends to prevent the wiper blade from travelling through the wiper cycle. In other case, in substantially cold weather, the wiper blade tends to be frozen on the windshield. In the former case, the wiper blade assembly takes longer period of complete the wiper cycle or cannot return to the predetermined initial position. On the other hand, when the wiper blade is frozen at the initial position or the rest position, the wiper blade cannot initiate wiper operation. FIGS. 5 and 6 show the examples of the fail condition of the wiper system, in which substantially heavy load is exerted on the wiper wiper motor due to high resistance against the motion of the wiper blade assembly, the period of time required for the wiper blade assembly to reach the motion end, i.e. the predetermined initial position become longer than the given period of time $T_1$. Then, the timer value of the fail-detecting timer 25 becomes greater than the $T_1$ period indicative value. The fail-detecting timer thus outputs the TIME-UP indicative signal. In the shown example, FIG. 5 illustrates the fail condition in which the wiper blade is locked during the wiper operation cycle, in which the movable contact 16a of the auto-stop switch 16 stays in contact with the stationary contact 16c, and FIG. 6 illustrates the fail condition in which the wiper blade is locked at the predetermined initial position or during travel from the predetermined initial position to the rest position.

Figure 5:
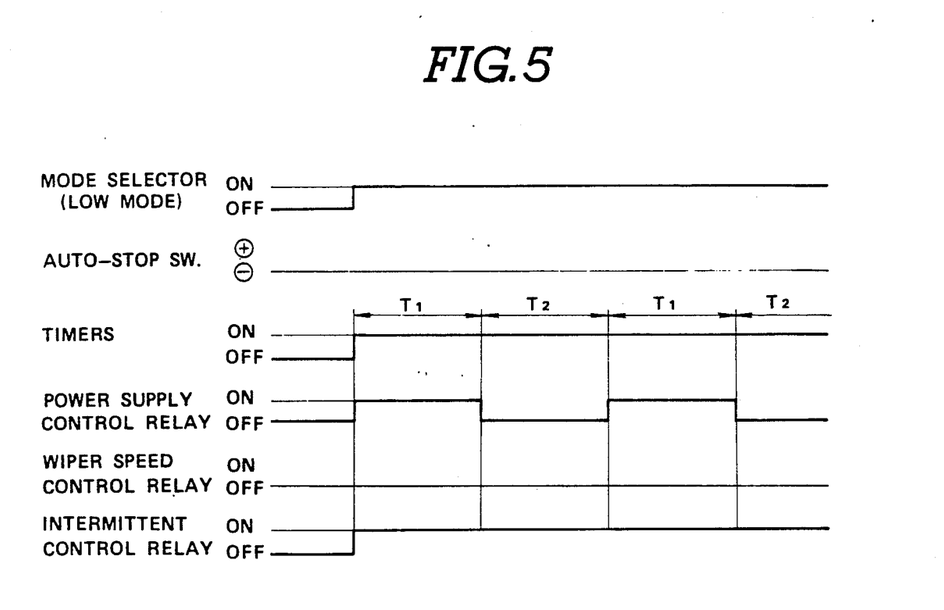
FIG. 5 is a similar timing chart to FIG. 3, but showing an example of detection of failure, in which an auto-stop signal is maintained unchanged for a period of time longer than a given period of time.
Figure 6:
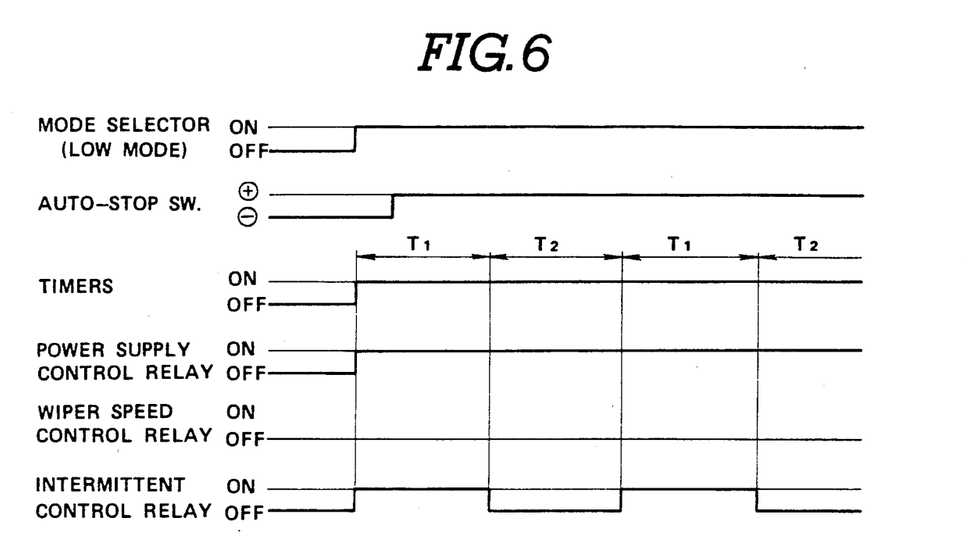
FIG. 6 is a similar timing chart to FIG. 4, but showing another example of detection of failure, in which an auto-stop signal is maintained unchanged for a period of time longer than a given period of time.

As shown in FIG. 5, when the wiper blade assembly is locked at intermediate position of the wiper cycle, the auto-stop signal of the auto-stop switch 16 is maintained LOW level. At the same time, the controller circuit 28 receives the LOW level auto-stop signal from the auto-stop switch 16 at one input terminal. The reset signal generator 23 is thus held inoperative so as not to produce the reset signal. Therefore, the flip-flop circuit 27 is held at set position to output the HIGH level set signal to the fail-detecting timer 25. The fail-detecting timer 25 outputs the TIME-UP indicative signal when the measured elapsed time reaches the given period of time $T_1$. The TIME-UP indicative signal is fed to the fail-safe timer 26 to trigger the latter. At the same time, the TIME-UP indicative signal is fed to the flip-flop circuit 27 to set the latter. The flip-flop circuit 27 outputs HIGH level set signal to the controller circuit 28. Since the input from the auto-stop switch 16 is held LOW level, the controller circuit 28 is responsive to the HIGH level set signal from the flip-flop circuit 27 to turn the output level to the set input terminal of the flip-flop circuit 29 to HIGH level and the output level to the reset input terminal of the flip-flop circuit 29 to LOW. As a result, the flip-flop circuit 29 is set to deenergize the relay coil 13d of the power supply control relay switch 13. The power supply brush D of the wiper motor 12 is thus disconnected from the power source battery 15. Therefore, the wiper motor 15 stops driving.

While the wiper motor 15 is held deactivated, the fail-safe timer 26 measures the elapsed period of time. When the measured period reaches the given period of time $T_2$, the fail-safe timer 26 outputs the enabling signal. The enabling signal is fed to the reset input terminal of the flip-flop circuit 27 to reset the latter. Therefore, the input level to the controller circuit 28 from the flip-flop circuit 27 turns into LOW level. The controller circuit 28 is responsive to the LOW level input from the flip-flop circuit 27 to turn the signal levels to be applied to the set and reset input terminals of the flip-flop circuit 29 from HIGH to LOW and LOW to HIGH. Therefore, the flip-flop circuit 29 is reset to energize the relay coil 13d of the power supply control relay switch 13. Therefore, power supply through the power supply control relay switch 13 is resumed.

At the same time, the enabling signal of the fail-safe timer 26 is also fed to the fail-detecting timer 25 to reset the latter. The fail-detecting timer 25 thus restart measurement of the elapsed time. Therefore, as will be appreciated herefrom, the power source batter 15 is intermittently connected to the wiper motor 12 with the given interval $T_2$ for the given period of time $T_1$. This intermittent power supply for the wiper motor 12 is repeated until the auto-stop signal level changes from LOW level to HIGH level.

Since the $T_2$ period is set long enough to sufficiently cool the wiper motor therein, the burn-out of the wiper motor can be successfully prevented.

On the other hand, when the wiper blade assembly is locked at the initial position where the movable contact 16a of the auto-stop switch stays in contact with the stationary terminal 16b, this maintains the auto-stop signal level HIGH. Similarly to the foregoing, the reset signal generator 23 is thus held inoperative so as not to produce the reset signal, as shown in FIG. 6. At the same time, the HIGH level auto-stop switch is input to the controller circuit 28 from the auto-stop switch. Therefore, the flip-flop circuit 27 is held at set position to output the HIGH level set signal to the fail-detecting timer 25. The fail-detecting timer 25 outputs the TIME-UP indicative signal when the measured elapsed time reaches the given period of time $T_1$. The TIME-UP indicative signal is fed to the fail-safe timer 26 to trigger the latter. At the same time, tie TIME-UP indicative signal is fed to the flip-flop circuit 27 to set the latter. The flip-flop circuit 27 outputs HIGH level set signal to the controller circuit 28. Since the input level from the auto-stop switch 16 is held HIGH level, the controller circuit 28 is responsive to the HIGH level set signal from the flip-flop circuit 27 to turn the output level to the set input terminal of the flip-flop circuit 30 to HIGH level and the output level to the reset input terminal of the flip-flop circuit 30 to LOW. As a result, the flip-flop circuit 30 is set to deenergize the relay coil 17d of the intermittent control relay switch 17. The movable contact 17a of the intermittent control relay switch 17 is thus shifted to contact with the stationary terminal 17c. This blocks the electric current flowing through the wiper motor 12. Therefore, the wiper motor 15 stops driving. While the wiper motor 15 is held deactivated, the fail-safe timer 26 measures the elapsed period of time. When the measured period reaches the given period of time $T_2$, the fail-safe timer 26 outputs the enabling signal. The enabling signal is fed to the reset input terminal of the flip-flop circuit 27 to reset the latter. Therefore, the input level to the controller circuit 28 from the flip-flop circuit 27 turns into LOW level. The controller circuit 28 is responsive to the LOW level input from the flip-flop circuit 27 to turn the signal levels to be applied to the set and rest input terminals of the flip-flop circuit 30 from HIGH to LOW and LOW to HIGH. Therefore, the flip-flop circuit 30 is reset to energize the relay coil 17d of the intermittent control relay switch 17. Therefore, the low speed brush L of the wiper motor 12 is connected to the ground through the movable contact 17a and the stationary terminal 17b. This resumes the wiper motor 12 driving through the power supply control relay switch 13 is resumed.

At the same time, the enabling signal of the fail-safe timer 26 is also fed to the fail-detecting timer 25 to reset the latter. The fail-detecting timer 25 thus restart measurement of the elapsed time. Therefore, as will be appreciated herefrom, the power source battery 15 is intermittently connected to the wiper motor 12 with the given interval $T_2$ for the given period of time $T_1$. This intermittent power supply for the wiper motor 12 is repeated until the auto-stop signal level changes from LOW level to HIGH level.

When the mode selector switch is operated from any one of LOW mode, HIGH mode and INTERMITTENT mode to OFF mode or when the mode selector switch is released from WASHER mode, the OFF mode signal is input to the controller circuit 28. If the OFF mode is selected at the wiper blade assembly position intermediate in the wiper cycle, the wiper motor operation is continued until the current cycle of wiper operation is completed. When the wiper blade assembly reached the motion end, i.e. the predetermined initial position, the movable contact 16a of the auto-stop switch 16 switches its position to contact with the stationary terminal 16b. At this condiction, the controller circuit 28 applies LOW level signal to the reset input terminal and HIGH level signal to the set input terminal of the power supply control flip-flop circuit 29 to set. This deenergizes the relay coil 13d of the power supply control relay switch 13 to switch the position of the movable contact 13a to contact with the stationary contact 13c. As a result, the power supply brush D of the wiper motor is connected to the ground. At this time, since the movable contact 16a of the auto-stop switch 16 stays in contact with the stationary terminal 16b, the driving power is supplied from the power source battery to the wiper motor 12 through the auto-stop switch 16, the intermittent control relay switch 17 and the wiper speed control relay switch 14. Therefrom the wiper motor 12 is driven in reverse direction to drive the wiper blade assembly from the initial position to the rest position.

At this time, the OFF timer 21 becomes active to output HIGH level signal for a given period of time. By this HIGH level signal from the OFF timer, the flip-flop circuit 24 is maintained at set position. At this time, the wiper motor 12 is driven in reverse direction to move the wiper blade assembly from the initial position to the downwardly shifted rest position or inoperative position. While the wiper blade travels from the initial position to the reset position, the auto-stop switch 16 is active to output the HIGH level auto-stop signal. Therefore, when the wiper blade is locked at the intermediate position between the initial position and the rest position, the reset signal is not output from the reset signal generator 23. Therefore, the flip-flop circuit 27 is set to input the HIGH level signal to the controller circuit 28 after the given period of time $T_1$. The controller circuit 28 is responsive to this HIGH level input from the flip-flop circuit 27 to output LOW level control signal to the set input terminal of the power supply control flip-flop circuit 30 and HIGH level control signal to the reset input terminal of the flip-flop circuit 30 to reset the latter. Therefore, the movable contact 17a of the intermittent control relay switch 17 is shifted to contact with the stationary terminal 17b. As a result, electrical connection between the wiper motor 12 and the power source battery 15 via the auto-stop switch is cut. The controller circuit 28 maintains these control signals even after the given period of time $T_2$ to maintain the wiper motor 12 inoperative condition.

It should be appreciated that the given period of times $T_1$ and $T_2$ can be set at any desired length depending upon the wiper motor characteristics and so forth. However, in the shown embodiment, the $T_1$ period is set at 4 sec. and the $T_2$ period is set at 8 sec.

Figure 7:
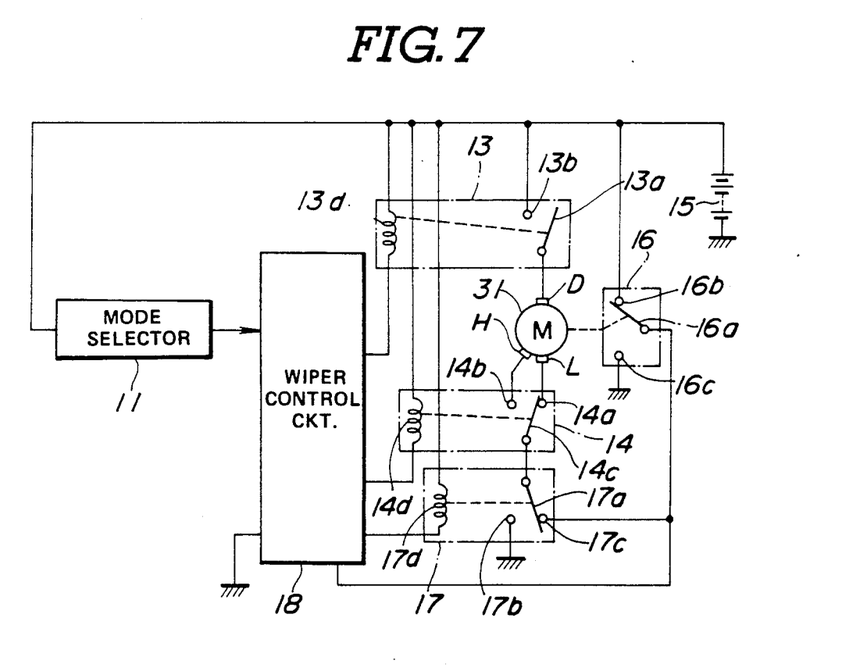
FIG. 7 is a partial block diagram of another embodiment of the wiper control system according to the invention.

FIG. 7 shows another preferred embodiment of the wiper control system according to the invention. In this embodiment, a wiper control circuit 18 in the wiper control system comprises a microprocessor-based circuit. The shown embodiment of the wiper control system is applied for the wiper system which has no rise-up function. Since the wiper system does not have the rise-up function, the power supply control relay switch 13 is operable between ON position and OFF position and thus the stationary terminal connected to the gound for reverse driving of the wiper motor is neglected.

In this embodiment, the auto-stop switch 16 is so designed as to maintain LOW level signal while the wiper blade is in the intermediate position and turned into HIGH level when the wiper blade reaches the predetermined initial position. Therefore, the auto-stop signal rises to HIGH level everytime the wiper blade assembly reaches its initial position.

As shown in FIG. 7, the wiper control circuit 18 in the shown embodiment incorporates a clock generator 40, a fail-detecting timer 41, a fail-safe timer 42. The fail-detecting timer 41 is designed to count the clock pulse of the clock generator, reast the fail-detecting timer value everytime the auto-stop signal of the auto-stop switch 16 turns into LOW level and re-start counting of the clock pulse. ON the other hand, the fail-safe timer 42 is designed to be activated in response to the TIME-UP signal which is produced by the fail-detecting timer 41 when the timer value of timer 41 reaches a given value which corresponds to the given period of time $T_1$.

Operation of the aforementioned embodiment of the wiper control system of FIG. 7, will be described herebelow with reference to FIGS. 8 to 11.

Figure 8:
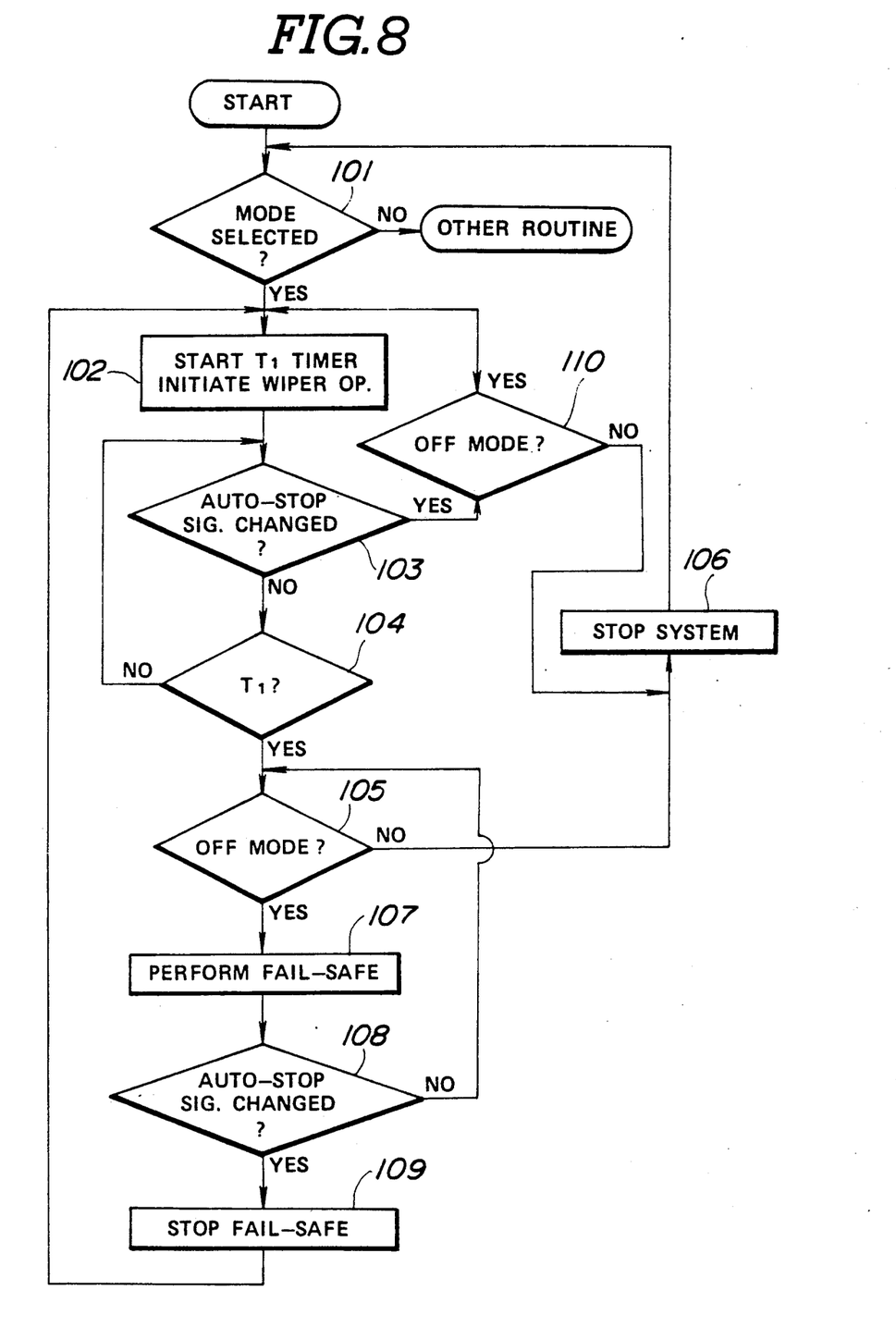
FIG. 8 is a flowchart of a wiper control program to be executed by the wiper control system of FIG. 7.
Figure 9:
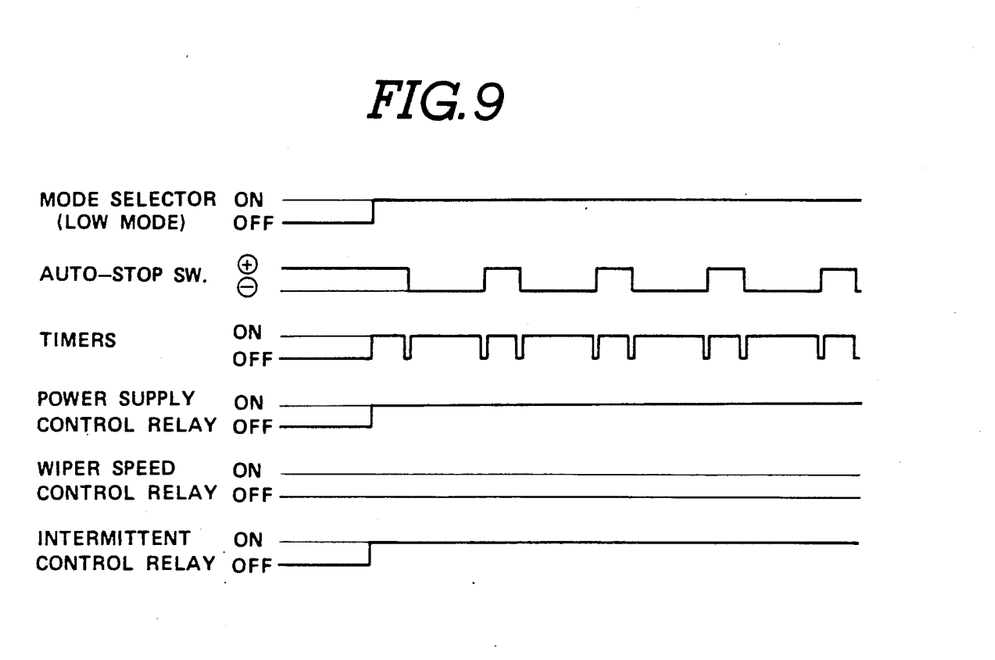
FIG. 9 is timing chart showing the operation of the wiper control system of FIG. 7, as operated in LOW mode and showing normal operation in LOW mode.

FIG. 8 shows a flow chart of a wiper control program to be executed by the wiper control circuit 18 of FIG. 7. As shown in FIG. 8, immediately after starting execution, the output of the mode selector switch 11 is checked at a step 101. If the mode selector switch 11 is held at OFF mode position, the step 101 is repeated until the mode selector switch is operated into other than OFF mode position. When the mode selector switch 11 is operated into one of LOW mode, HIGH mode, INTERMITTENT mode and WASHER mode positions, process goes to a step 102. In the step 102, the fail-detecting timer 41 is triggered to start counting up of the clock pulse of the clock signal generator 40. At the same time, the wiper motor 12 starts driving to perform wiper operation according to the selected one of the operation modes, i.e. LOW mode, HIGH mode, INTERMITTENT mode and WASHER mode. After the step 102, the input level from the auto-stop switch 16 is checked whether the auto-stop signal drops into LOW level at a step 103. Assuming the mode selector switch 11 is operated into LOW mode position, the power source battery 15 is connected to the wiper motor via the ON terminal 13b, the movable contact 13a, the power supply brush D, and, further connected tot he ground via the stationary terminal 14a, the movable contact 14c, the movable contact 17a and the stationary terminal 17b. Therefore, the wiper motor 12 is driven at LOW speed. As set forth above, during the wiper cycle, the movable contact 16a of the auto-stop switch 16 stays in contact with the stationary terminal 16c and turns into contact with the stationary terminal 16b at the motion end in each cycle of wiper operation. Therefore, everytime the wiper cycle is completed, the auto-stop signal level changes from LOW level to HIGH level. When change of the auto-stop signal level is detected as checked at the step 103, the process goes to a step 110 to check whether the mode selector switch 11 is held other than OFF position. If the mode selector switch 11 is in the switch position other than the OFF position, the process returns to the step 102 to reset the timer value of the fail-detecting timer 41 and restart counting of the clock pulse in the timer 41. On the other hand, when operation of the mode selector switch 11 into the OFF mode position is detected at the step 110, the process goes to a step 106 to stop system operation. After stopping the system operation at the step 106, the process returns to the step 101 to wail for the next mode selector operation. Therefore, as shown in FIG. 9, as long as the wiper system operates in normal mode, the timer value of the fail-detecting timer 41 is repeatedly reset so as not to initiate fail-safe operation.

On the other hand, when the auto-stop signal as checked at the step 103, is held unchanged, the timer value of the fail-detecting timer 41 is compared with a predetermined $T_1$ value corresponding to the predetermined period of time $T_1$, at a step 104. If the timer value as checked at the step 104 is smaller than the $T_1$ value, then process returns to the step 103. On the other hand, when the timer value of the fail-detecting timer 41 becomes greater than or equal to the $T_1$ value, as checked at the step 104, the mode selector position is checked at a step 105. If the mode selector switch 11 operated at the OFF mode position is detected as checked at the step 105, the process goes to the step 106 to stop system operation.

Figure 10:
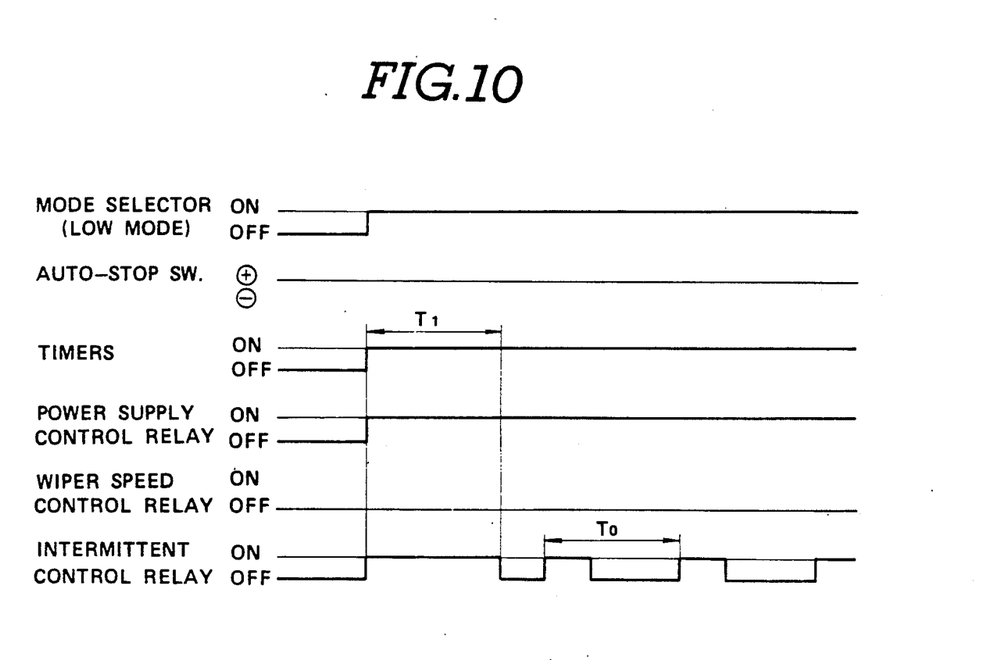
FIG. 10 is a similar timing chart to FIG. 9, but showing an example of detection of failure, in which an auto-stop signal is maintained unchanged for a period of time longer than a given period of time.
Figure 11:
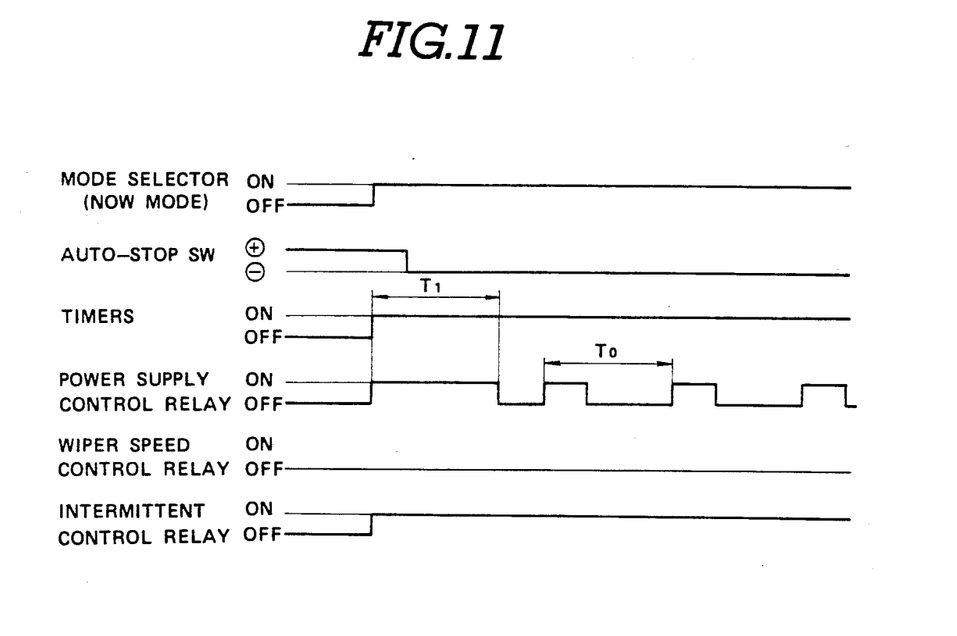
FIG. 11 is a similar timing chart to FIG. 9, but showing another example of detection of failure , in which an auto-stop signal is maintained unchanged for a period of time longer than a given period of time.

On the other hand, when the mode selector switch 11 is held at the switch position other than the OFF mode position, as checked at the step 105, a fail-safe operation is taken place at a step 107. In the practical operation, the fail-safe operation is taken place to deenergize the relay coil 17d of the intermittent control relay switch 17 when the wiper blade is locked at the initial position, in which the movable contact 16a of the auto-stop switch 16 is in contact with the stationary terminal 16b. The controller circuit 28 maintains this condition for a given period of time to cause intermittent power supply with a period $T_0$, as shown in FIG. 10. On the other hand, when the wiper blade is locked at the intermediate position in the wiper cycle, the relay coil 13d of the power supply control relay switch 13 is deenergized for a given period of time $T_0$ to maintain the movable contact 13a to the OFF position for the given period of time, as shown in FIG. 10.

After the fail-safe operation at the step 107, the auto-stop signal level is checked at a step 108. When the auto-stop signal level is maintained HIGH level as checked at the step 108, the process returns to the step 105. On the other hand, auto-stop signal drops to LOW level as checked at the step 109, the process returns to the step 102.

Similarly to the foregoing first embodiment, the failure of the wiper system can be detected utilizing the auto-stop switch position irrelative to the environmental condition. This assures detection of the failure of the wiper system and thus assures fail-sale operation. Furthermore, since the fail-safe operation is taken place to stop the wiper motor for cooling off the motor, burn-in of the wiper motor can be successfully prevented.

What is claimed is:

1. An automotive wiper control system comprising:
   a wiper motor for driving a wiper blade assembly through each wiper cycle;
   a power source for supplying power for said wiper motor;
   means for detecting said wiper blade assembly at a predetermined position for producing a detector signal when said wiper blade assembly is at said predetermined position;
   means for measuring an elapsed wiper cycle time during wiper operation, said measuring means being responsive to said detector signal for resetting the measured time in response to said detector signal and producing a failure indicative signal when said measured time reaches a given period of time;
   controlling means including a power supply control switch means interposed between said power source and said wiper motor and operative between a first position in which said wiper motor is connected to said power source and a second position where said wiper motor is disconnected from said power source, and an intermittent control switch means interposed between said wiper motor and the ground and operative between a first position to connect said wiper motor to the ground and a second position where said wiper motor is disconnected from the ground, and means responsive to said failure indicative signals to switch one of said power supply control switch means and said intermittent control switch means to said second position to stop driving of said wiper motor.

2. An automotive wiper control system as set forth in claim 1, wherein said power supply control switch means is operated to said second position while a wiper position detector switch means of said detecting means is in a first position, and said intermittent control switch means is operated to said second position when said wiper position detector switch means of said detecting means is in a second position.

3. A control system for controlling an automotive wiper system which is operative at least in LOW speed mode in which a wiper motor is driven continuously at a predetermined low speed, HIGH speed mode, in which said wiper motor is driven continuously at a predetermined high speed, and an INTERMITTENT mode, in which said wiper motor is intermittently driven to stop at a predetermined position for a predetermined intermittent interval after each cycle of wiper operation, said control system comprising:

a power source for supplying power to said wiper motor;

means for detecting a wiper operation cycle taking an abnormally long period of time which is longer than a given reference period to produce a failure indicative signal;

means for controlling said wiper motor for driving the latter at a controlled speed and timing according to a selected operation mode, said controlling means including a power supply control switch means interposed between said power source and said wiper motor and operative between a first position in which said wiper motor is connected to said power source and a second position where said wiper motor is disconnected from said power source, and an intermittent control switch means interposed between said wiper motor and the ground and operative between a first position to connect said wiper motor to the ground and a second position where said wiper motor is disconnected from the ground, and means responsive to said failure indicative signal to switch one of said power supply control switch means and said intermittent control switch means to said second position to stop driving of said wiper motor.

4. A control system as set forth in claim 3, wherein said power supply control switch means is operated to said second position while a wiper position detector switch means of said detecting mean sis in a first position, and said intermittent control switch means is operated to said second position when said wiper position detector switch means of said detecting means is in a second position.

* * * * *